United States Patent Office 2,774,775
Patented Dec. 18, 1956

2,774,775
CARBONYLOXY STEROIDS

Jerome Korman, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application January 26, 1954,
Serial No. 406,364

9 Claims. (Cl. 260—397.1)

This invention relates to a novel class of carbonyloxy steroids, more particularly to certain 3-keto-1,4,17(20)-pregnatriene-21-oic acids and alkyl esters thereof and to a process for their production.

The process of the present invention and the novel compounds thus-produced may be represented by the following formulae:

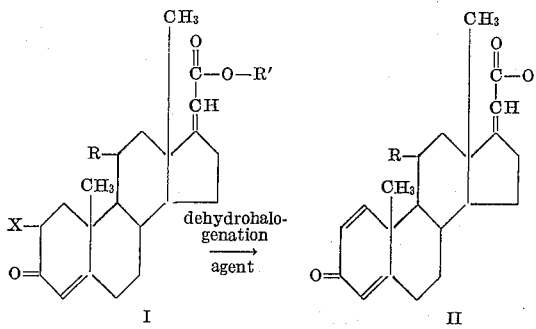

wherein X is a halogen having an atomic weight from 35 to 127, i. e., chlorine, bromine, or iodine, wherein R is a substituent from the group consisting of a hydrogen atom, an α-hydroxy group, a β-hydroxy group, an α-acyloxy group, especially lower-acyloxy, e. g., α-acetoxy, a 9(11)-double bond, a 9,11-oxido group or a ketonic oxygen (=O), and wherein R' is a hydrogen atom or an alkyl radical, especially lower-alkyl, e. g., methyl or ethyl.

According to the present invention 2-halo-3-keto-4,17(20)-pregnadiene-21-oic acid or alkyl esters thereof represented by Formula I is dehydrohalogenated with a dehydrohalogenation agent to produce, respectively a 3-keto-1,4,17(20)-pregnatriene-21-oic acid and alkyl esters thereof represented by Formula II. Hydrolysis of an alkyl 3-keto-1,4,17(20)-pregnatriene-21-oate (I, R=alkyl) with an acidic or basic hydrolyzing agent is productive of a 3-keto-1,4,17(20)-pregnatriene-21-oic acid (II, R=H).

Starting steroids for the process of the present invention are 2-halo-3-keto-4,17(20)-pregnadiene-21-oic acids and esters thereof represented by Formula I. Of these starting steroids, the alkyl 3-keto-4,17(20)-pregnadiene-21-oates are preferred, especially wherein the alkyl ester is lower-alkyl, preferably methyl or ethyl, and wherein X is bromine. These starting steroids may be prepared according to the method disclosed and claimed in application Serial No. 346,274, filed April 1, 1953, and as disclosed in the preparations hereinafter.

Dehydrohalogenation agents which may be employed include lithium chloride, potassium acetate, pyridine and the alkyl pyridines, e. g., the picolines, β-lutidines, α,β-collidines, γ-collidines, parvulines, parvolines, and the like. Of the dehydrohalogenation agents, lithium chloride and sym. γ-collidine, viz., 2,4,6-trimethylpyridine, give outstandingly superior results and are the dehydrohalogenation agents of choice.

In carrying out the process of the present invention, the starting 2-halo steriod is usually dissolved in the dehydrohalogenation agent, if it is a liquid solvent for the steroid, or both the dehydrohalogenation agent and the steroid are dissolved in a substantially inert diluent and then heated, usually at a temperature substantially above room temperature, e. g., between about fifty and about 250 degrees centigrade, for about fifteen minutes to several hours, although the reaction ordinarily begins as soon as the heating commences. Since 2,4,6-trimethylpyridine is usually selected as the dehydrohalogenation agent, the reaction is usually performed at about the boiling point of the 2,4,6-trimethylpyridine, unless an organic diluent is employed. Ordinarily, the dehydrohalogenation agent is employed in a ratio to the starting steroid of about four to one or greater.

The novel compounds of the present invention are useful in the production of $\Delta^1$-unsaturated adrenal cortical hormones having modified cortical hormone activity, e. g., $\Delta^1$-hydrocortisone, $\Delta^1$-cortisone, $\Delta^1$-11-desoxyhydrocortisone (17α,21-dihydroxy-1,4-pregnadiene-3,20-dione) and 21-esters therof, e. g., the 21-formate, acetate, propionate, butyrate, cyclopentylpropionate, dimethyl-acetate, trimethylacetate, phenylacetate, phenylpropionate, succinate, benzoate, and the like, of these compounds in the same manner disclosed in application Serial No. 346,274, filed April 1, 1953, for the production of hydrocortisone, cortisone and Compound S, i. e., protecting the 3-keto group with an enol ether, cyclic ketal, or preferably with a pyrrolidyl enamine, then reducing the 21-carbonyloxy group with lithium aluminum hydride, lithium borohydride, or the like, followed by the hydrolysis, usually with acid, of the enamine group to regenerate the $\Delta^{1,4}$-3-keto group, acylation of the 21-hydroxy group to produce a 21-acyloxy-1,4,17(20)-pregnatriene-3-one corresponding, other than at the 21-position, to the 21-carbonyloxy steroids represented by Formula II, and then introducing the 17α-hydroxy-20-keto group by reaction of the thus-produced 21-acyloxy steroid with hydrogen peroxide and a small proportion of osmium tetroxide, to produce a 17α-hydroxy-21-acyloxy-1,4-pregnadiene-3,20-dione which is either physiologically active per se or can be converted by known chemical means into the physiologically active adrenal cortical hormones, e. g., hydrogenating the double bonds and then brominating the 4-position followed by dehydrohalogenation.

Alternatively, the compounds of the present invention can be converted into the known estrogenic sex hormones or sex hormone-like compounds by demethylation of the methyl group attached to carbon atom 10, according to methods known in the art, followed by an oxidation of the side chain to produce a 17-keto compound such as, for example, estrone, 11-keto or 11α or β-hydroxy estrone, or methyl ethers thereof, which can be converted by chemical reduction of the 17-keto group, into the physiologically active estradiol or methyl ether thereof or into compounds which possess estradiol-like activity or can be converted into estradiol or the methyl ether thereof.

A further variation of the conversion of the compounds of the present invention into compounds having estradiol-like or adrenal cortical hormone activity can be had by reacting the aromatized demethylated compounds mentioned above, i. e., alkyl 3-hydroxy-10-nor-methyl - 1,3,5(10),17(20) - pregnatetraene - 21 - oates, with lithium aluminum hydride, to produce the corresponding $\Delta^{1,3,5(10),17(20)}$-3,21-dihydroxy compounds followed by the Birch reaction to produce the $\Delta^4$-3-keto group in the A ring. Esterification of the 21-hydroxy group with, for example, acetic anhydride, followed by the introduction of the 17α-hydroxy-20-keto group with hydrogen peroxide and a small amount of osmium tetroxide, is productive of esters of the physiologically active 10-normethyl adrenal cortical hormones, e. g., 10-normethylcortisone acetate, 10-normethylhydrocortisone acetate and 10-normethyl-11-desoxyhydrocortisone acetate.

The following examples are illustrative of the process and products of the present invention which is not to be construed as limited thereto.

PREPARATION 1.—2,21-DIETHOXYOXALKYL-11-KETOPROGESTERONE AND SODIUM DIENOLATE THEREOF

Ninteen milliliters (0.136 mole) of ethyl oxalate and 21.2 milliliters (0.047 mole) of a 2.2 normal methanolic solution of sodium methoxide was added to a solution of 6.9 grams (0.021 mole) of 11-ketoprogesterone in 100 milliliters of anhydrous tertiary butyl alcohol at about fifty degrees centigrade. The mixture was maintained at room temperature for three hours, whereafter the precipitated sodium dienolate of 2,21-diethoxyoxalyl-11-ketoprogesterone was filtered, washed with ether and then dissolved in water. The aqueous solution was acidified with dilute hydrochloric acid and the thus-precipitated 2,21 - diethoxyoxalyl - 11 - ketoprogesterone was filtered therefrom and then dried to yield 10.2 grams, a yield of 92 percent of the theoretical, of 2,21-diethoxyoxalyl-11-ketoprogesterone in the form of a yellow amorphous powder which exhibited a reddish color in an alcoholic ferric chloride solution and had the analysis given below.

*Analysis.*—Calculated for $C_{29}H_{36}O_9$: C, 65.89; H, 6.87. Found: C, 66.25; H, 6.67.

In the same manner as illustrated in the above example, other 2,21-dialkoxyoxalyl-11-ketoprogesterones and their sodium enolates are prepared by the substitution of the selected alkyl oxalate for the diethyl oxalate used in the above example. Compounds thus-prepared include those wherein the alkoxy group is lower-alkoxy, e. g., methoxy, propoxy, butoxy, amyloxy, hexyloxy, heptyloxy, octyloxy, and the like.

PREPARATION 2.—2,21-DIETHOXYOXALYL-11α-HYDROXYPROGESTERONE AND SODIUM DIENOLATE THEREOF

In the same manner as described in Preparation 1, the 2,21-diethoxyoxalyl-11α-hydroxyprogesterone and the sodium dienolate thereof are prepared by the substitution of 11α-hydroxyprogesterone [Peterson and Murray, J. Am. Chem. Soc., 74, 2381 (1952)] for the 11-ketoprogesterone used in the therein-described reaction as the starting steroid.

PREPARATION 3.—2,21-DIETHOXYOXALYL-11β-HYDROXYPROGESTERONE AND SODIUM DIENOLATE THEREOF

In the same manner as described in Preparation 1, the 2,21-diethoxyoxalyl-11β-hydroxyprogesterone and the sodium dienolate thereof are prepared by the substitution of 11β-hydroxyprogesterone for the 11-ketoprogesterone used in the therein-described reaction as the starting steroid.

PREPARATION 4.—2,21-DIETHOXYOXALYLPROGESTERONE AND SODIUM DIENOLATE THEREOF

In the same manner as described in Preparation 1, the 2,21-diethoxyoxalylprogesterone and the sodium dienolate thereof are prepared by the substitution of progesterone for the 11-ketoprogesterone used in the therein-described reaction as the starting steroid. Substituting $\Delta^{9(11)}$-progesterone, an 11α-acyloxyprogesterone, e. g., 11α-acetoxyprogesterone, or 9,11-oxidoprogesterone, for 11-ketoprogesterone as a starting steroid in the reaction described in Preparation 1, is productive, respectively, of 2,21-diethoxyoxalyl-$\Delta^{9(11)}$-progesterone, a 2,21-diethoxyoxalyl-11α-acyloxyprogesterone, e. g., 2,21-diethoxyoxalyl-11α-acetoxyprogesterone, and 2,21-diethoxyoxalyl-9,11-oxidoprogesterone and the sodium dienolates thereof.

Similarly, the 2,21-di-(lower-alkoxyoxalyl) homologues of the compounds of Preparations 1 through 4 are prepared by substituting the selected lower-alkyl diester of oxalic acid, wherein the alkyl groups are methyl, propyl, butyl, isobutyl, amyl, hexyl, heptyl, octyl, or the like, for the diethyl oxalate used in the therein-described reactions.

The potassium enolates of any of the above-named 2,21-diethoxyoxalyl compounds or lower-alkoxy homologues thereof are prepared by the substitution of potassium tertiary butoxide for the sodium methoxide in the above-described reactions.

PREPARATION 5.—METHYL 2-BROMO-3,11-DIKETO-4,17(20)-PREGNADIENE - 21 - OATE (FROM ISOLATED 2,21-DIETHOXYOXALYL-11-KETOPROGESTERONE)

A solution of eight grams (0.015 mole) of the 2,21-diethoxyoxalyl-11-ketoprogesterone obtained according to the method described in Preparation 1 and 5.9 grams (0.060 mole) of anhydrous potassium acetate in 140 milliliters of methanol was cooled to zero degrees centigrade in an ice bath and a solution of 7.4 grams (0.046 mole) of bromine in 74 milliliters of methanol was then added dropwise thereto over a period of about one-half hour to produce 2,21,21-tribromo-2,21-diethoxyoxalyl-11-ketoprogesterone. To the resulting mixture was then added about fifty milligrams of phenol and 67 milliliters (0.100 mole) of a 1.5 normal methanolic solution of sodium methoxide whereafter the mixture was heated for five minutes on a steam bath followed by the addition of the cooled solution to water. A flocculent white precipitate of methyl 2-bromo-3,11-diketo-4,17(20)-pregnadiene-21-oate formed, and, after being thoroughly washed with water and dried in a vacuum desiccator, weighed 6.77 grams and melted at 74 to 94 degrees centigrade. 1.50 grams of this impure product was chromatographed over 150 grams of Florisil magnesium silicate. The column was developed with 200-milliliter portions of solvents of the following composition and order: one of benzene, ten of Skellysolve B hexane hydrocarbons plus five percent acetone, and ten of Skellysolve B plus 7.5 percent acetone. The second, third and fourth portions of Skellysolve B plus 7.5 percent acetone eluates were combined and the solvent was distilled therefrom leaving 382 milligrams of product melting at 130 to 154 degrees centigrade. Recrystallization of these crystals from methanol gave analytically pure methyl 2-bromo-3,11-diketo-4,17(20)-pregnadiene-21-oate as transparent prisms whose melting point varied between 155 to 160 degrees centigrade and 160 to 162 degrees centigrade, depending upon the rate of heating.

*Analysis.*—Calculated for $C_{22}H_{27}BrO_4$: Br, 18.36. Found: Br, 18.46.

In a similar manner, methyl 2-bromo-3,11-diketo-4,17-(20)-pregnadiene-21-oate ester is prepared from other 2,21,21-tribromo-2,21-dialkoxyoxalyl - 11 - ketoprogesterones wherein the alkyl group of the alkoxy radical is ethyl, propyl, butyl, amyl, hexyl, heptyl, octyl, or the like, by the replacement of the 2,21,21-tribromo-2,21-diethoxyoxalyl - 11 - ketoprogesterone in the above-described reaction by the selected 2,21,21-tribromo-2,21-dialkoxyoxalyl-11-ketoprogesterone.

Similarly, other alkyl 2-bromo-3-keto-4,17(20)-pregnadiene-21-oates, especially lower-alkyl, having at the 11-position hydrogen, an α-hydroxy group, a β-hydroxy group, or a ketonic oxygen, are prepared by the reaction of the appropriate 2,21,21-tribromo-2,21-dialkoxyoxalylprogesterone with an alkali-metal alkoxide in an alkanol wherein the alkyl group of the alkali-metal alkoxide and alkanol is methyl, ethyl, propyl, butyl, amyl, hexyl, heptyl, octyl, or the like. Compounds thus-produced include methyl 2-bromo-11α-hydroxy-4,17(20)-pregnadiene-21-oate, methyl 2-bromo-11β-hydroxy-4,17(20)-pregnadiene-21-oate, methyl 2-bromo-4,17(20)-pregnadiene-21-oate, the corresponding ethyl esters of the above-named compounds as well as other lower-alkyl esters.

PREPARATION 6.—METHYL 2-CHLORO-3,11-DIKETO-4,17(20)-PREGNADIENE-21-OATE

Following the procedure described in Preparation 5, but substituting an equimolar amount of chlorine for the bromine used therein, 2,21-diethoxyoxalyl-11-ketoprogesterone is converted to 2,21,21-trichloro-2,21-diethoxyoxalyl-11-ketoprogesterone. Reacting the thus-produced 2,21,21-trichloro-2,21-diethoxyoxalyl-11-ketoprogesterone with sodium methoxide in the same manner as described in Preparation 5 is productive of methyl 2-chloro-3,11-diketo-4,17(20)-pregnadiene-21-oate.

Similarly, substituting 2,21-diethoxyoxalylprogesterone, 2,21-diethoxyoxalyl-11α-hydroxyprogesterone, 2,21-diethoxyoxalyl - 11β - hydroxyprogesterone, 2,21 - diethoxyoxalyl - 11α - acyloxyprogesterone, e. g., 2,21 - diethoxyoxalyl - 11α - acetoxyprogesterone, 2,21 - diethoxyoxalyl-$\Delta^{9(11)}$-progesterone, or 2,21 - diethoxyoxalyl-9,11-oxidoprogesterone for the 2,21 - diethoxyoxalyl - 11 - ketoprogesterone used as the starting steroid in the reaction described in Preparation 5, is productive, respectively, of methyl 2 - bromo - 4,17(20) - pregnadiene - 21 - oate, methyl 2 - bromo - 11α - hydroxy - 4,17(20) - pregnadiene - 21 - oate, methyl 2 - bromo - 11β - hydroxy - 4,17(20) - pregnadiene - 21 - oate, methyl 2 - bromo-11α - acyloxy - 4,17(20) - pregnadiene - 21 - oate, e. g., methyl 2 - bromo - 11α - acetoxy - 4,17(20) - pregnadiene - 21 - oate, methyl 2 - bromo - 4,9(11),17(20) - pregnatriene - 21 - oate and methyl 2 - bromo - 9,11-oxido-4,17(20) - pregnadiene - 21 - oate.

The 2-chloro analogues of any of the compounds named in Preparations 5 and 6 are prepared by substituting chlorine for the bromine used in the halogenation step of those preparations.

The 2-iodo analogues of any of the above-named alkyl 2-halo-3-keto-4,17(20)-pregnadiene-21-oates are prepared by reaction of the selected 2-bromo compound with sodium iodide and iodine.

Example 1.—Methyl 3-keto-1,4,17(20)-pregnatriene-21-oate

A mixture of 0.101 gram (0.2 millimole) of methyl 2-bromo-3-keto-4,17(20)-pregnadiene-21-oate and 0.6 milliliter of γ-collidine was heated at the refluxing temperature of the mixture for thirty minutes and then cooled to room temperature. The cooled mixture was diluted with ether and the 29 milligrams of collidine hydrobromide which precipitated was filtered from the solution. The filtrate was washed with dilute sulfuric acid followed by water and then dried over anhydrous sodium sulfate. The dried solution was freed of solvent and the oily residue was chromatographed over four grams of alumina. The column was developed with Skellysolve B hexane hydrocarbons containing increasing amounts of benzene. The eluate fraction containing Skellysolve B plus 75 percent benzene was freed of solvent by evaporation to give methyl 3 - keto - 1,4,17(20) - pregnatriene - 21 - oate which, when crystallized from a mixture of Skellysolve B hexane hydrocarbons and acetone, melted at 161 to 170 degrees centigrade. A second crystallization from the same solvents raised the melting point of the product to 173.5 to 177 degrees centigrade.

Hydrolysis of methyl 3 - keto - 1,4,17(20) - pregnatriene - 21 - oate with potassium hydroxide in a mixture of acetone and water is productive of a solution of the potassium salt of the free acid which, when neutralized with dilute hydrochloric acid, is productive of 3 - keto-1,4,17(20)-pregnatriene-21-oic acid.

Example 2.—Methyl 3,11-diketo-1,4,17(20)-pregnatriene-21-oate

Following the procedure described in Example 1, 0.21 gram (0.48 millimole) of methyl 2-bromo-3,11-diketo-4,17(20)-pregnadiene-21-oate was reacted with 0.8 milliliter of redistilled γ-collidine to give methyl 3,11-diketo-1,4,17(20)-pregnatriene-21-oate which, without chromatographing but after crystallization from ethyl acetate, melted at 209.2 to 218.7 degrees centigrade. After recrystallization from ethyl acetate, the melting point of the product was raised to 229.2 to 233 degrees centigrade.

Hydrolysis of methyl 3,11-diketo-1,4,17(20)-pregnatriene-21-oate with potassium hydroxide in a mixture of acetone and water is productive of a solution of the potassium salt of the free acid which, when neutralized with dilute hydrochloric acid, is productive of 3,11-diketo-1,4,17(20)-pregnatriene-21-oic acid.

Example 3.—Methyl 3-keto-11α-hydroxy-1,4,17(20)-pregnatriene-21-oate

Following the procedure described in Example 1, methyl 2 - bromo - 3 - keto - 11α - hydroxy - 4,17(20)-pregnadiene - 21 - oate is converted, by reaction with γ-collidine, to methyl 3-keto-11α-hydroxy-1,4,17(20), pregnatriene-21-oate.

Hydrolysis of methyl 3-keto-11α-hydroxy-1,4,17(20)-pregnatriene-21-oate with potassium hydroxide in a mixture of acetone and water is productive of a solution of the potassium salt of the free acid which, when neutralized with dilute hydrochloric acid is productive of 3-keto-11α-hydroxy-1,4,17(20)-pregnatriene-21-oic acid.

Example 4.—Methyl 3-keto-11β-hydroxy-1,4,17(20)-pregnatriene-21-oate

Following the procedure described in Example 1, methyl 2 - bromo - 3 - keto - 11β - hydroxy - 4,17(20)-pregnadiene - 21 - oate is dehydrohalogenated to methyl 3 - keto - 11β - hydroxy - 1,4,17(20) - pregnatriene - 21-oate by reaction with γ-collidine.

Example 5.—Methyl 3-keto-11α-acetoxy-1,4,17(20)-pregnatriene-21-oate

Substituting methyl 2 - bromo - 3 - keto - 11α - acetoxy-4,17(20)-pregnadiene-21-oate as the starting steroid in the reaction described in Example 1 is productive of methyl 3 - keto - 11α - acetoxy - 1,4,17(20)-pregnatriene-21-oate as the reaction product.

Hydrolysis of methyl 3-keto-11α-acetoxy-1,4,17(20)-pregnatriene-21-oate with sodium hydroxide in a mixture of acetone and water is productive of a solution of the sodium salt of the free acid which, when neutralized with dilute hydrochloric acid, is productive of 3-keto-11α-acetoxy-1,4,17(20)-pregnatriene-21-oic acid.

Example 6.—Methyl 3-keto-9,11-oxido-1,4,17(20)-pregnatriene-21-oate

Substituting methyl 2 - bromo - 3 - keto - 9,11 - oxido-4,17(20)-pregnadiene-21-oate as the starting steroid in the reaction described in Example 1 is productive of methyl 3-keto-9,11-oxido-1,4,17(20)-pregnatriene-21-oate as the reaction product.

Hydrolysis of methyl 3-keto-9,11-oxido-1,4,17(20)-pregnatriene-21-oate with potassium hydroxide in a mixture of acetone and water is productive of a solution of the potassium salt of the free acid, which, when neutralized with dilute hydrochloric acid, is productive of 3-keto-9,11 - oxido - 1,4,17(20) - pregnatriene - 21 - oic acid.

Example 7.—Methyl 3-keto-1,4,9(11),17(20)-pregnatetraene-21-oate

Substituting methyl 2-bromo-3-keto-4,9(11),17(20)-pregnatriene-21-oate as the starting steroid in the reaction described in Example 1 is productive of methyl 3-keto-1,4,9(11),17(20)-pregnatetraene-21-oate as the reaction product.

Hydrolysis of methyl 3-keto-1,4,9(11),17(20)-pregnatetraene-21-oate with potassium hydroxide in a mixture of acetone and water is productive of a solution of the potassium salt of the free acid, which, when neutralized with dilute hydrochloric acid, is productive of 3-keto-1,4,9(11), 17(20)-pregnatetraene-21-oic acid.

In the same manner described in Examples 1 to 7, the same compounds produced therein are prepared by substituting the corresponding 2-chloro or 2-iodo steroid for the methyl 2-bromo-3-keto-4,17(20)-pregnadiene-21-oates employed therein as starting steroids.

Similarly, other alkyl 3-keto-1,4,17(20)-pregnatriene-21-oates, corresponding to the methyl 3-keto-1,4,17(20)-pregnatriene-21-oates prepared according to the procedure described in Examples 1 to 7, are prepared by substituting other alkyl esters for the methyl ester of the 2-bromo-3-keto-1,4,17(20)-pregnatriene-21-oic acids employed as starting steroids in these examples.

It is to be understood that this invention is not to be limited to the exact details of operation or exact compounds shown and described, as obvious modifications and equivalents will be apparent to one skilled in the art and the invention is therefore to be limited only by the scope of the appended claims.

We claim:

1. 3 - keto - 1,4,17(20) - pregnatriene - 21 - carbonyloxy steroid represented by the following formula:

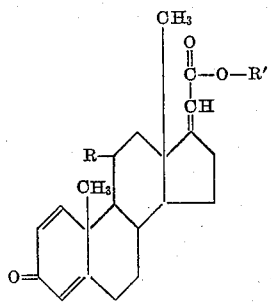

wherein R is a substituent selected from the group consisting of hydrogen, α-hydroxy, β-hydroxy, α-lower-hydrocarbonyloxy and ketonic oxygen and wherein R' is a radical selected from the group consisting of hydrogen and lower-alkyl.

2. Lower - alkyl 3 - keto - 11 - hydroxy - 1,4,17(20)-pregnatriene-21-oate represented by the following formula:

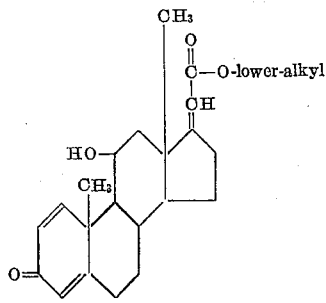

3. Lower - alkyl 3 - keto - 1,4,17(20) - pregnatriene-21-oate represented by the following formula:

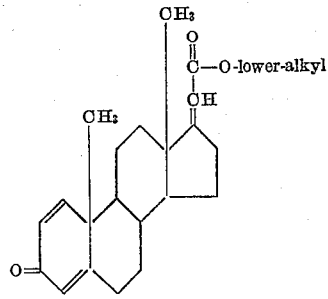

4. Lower - alkyl 3,11 - diketo - 1,4,17(20) - pregnatriene-21-oate represented by the following formula:

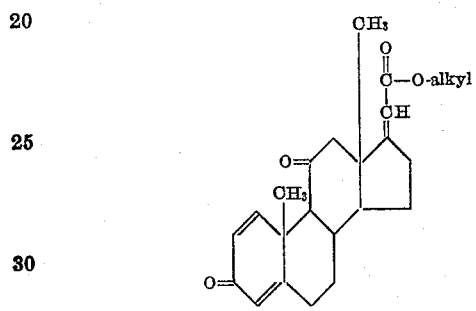

5. Methyl 3 - keto - 11α - hydroxy - 1,4,17(20) - pregnatriene-21-oate.
6. Methyl 3 - keto - 11β - hydroxy - 1,4,17(20) - pregnatriene-21-oate.
7. Methyl 3-keto-1,4,17(20)-pregnatriene-21-oate.
8. Methyl 3,11 - diketo - 1,4,17(20) - pregnatriene-21-oate.
9. Ethyl 3,11 - diketo - 1,4,17(20) - pregnatriene-21-oate.

References Cited in the file of this patent

UNITED STATES PATENTS 2,359,773   Marker _____ Oct. 10, 1944
2,441,560   Butenandt _____ May 18, 1948

OTHER REFERENCES

Experientia, vol. V, May 15, 1949, p. 204.